United States Patent

[11] 3,547,403

| [72] | Inventor | Oscar H. Grauer |
| | | Philadelphia, Pa. |
| [21] | Appl. No. | 790,362 |
| [22] | Filed | Jan. 10, 1969 |
| [45] | Patented | Dec. 15, 1970 |
| [73] | Assignee | Fischer & Porter Company |
| | | Warminister, Pa. |
| | | a corporation of Pennsylvania |

[54] BALL VALVES
6 Claims, 4 Drawing Figs.

[52] U.S. Cl.............................................. 251/170,
251/309, 251/315, 251/368
[51] Int. Cl........................................... F16k 5/14
[50] Field of Search.................................. 251/170,
171, 172, 174, 309, 315, 316, 317, 368

[56] References Cited
UNITED STATES PATENTS

| 2,986,374 | 5/1961 | Rakus............................ | 251/317 |
| 3,100,499 | 8/1963 | Bass.............................. | 251/315X |
| 3,111,136 | 11/1963 | Persidsky...................... | 251/315X |
| 3,167,300 | 1/1965 | Kaiser.......................... | 251/172X |
| 3,356,333 | 12/1967 | Scaramucci.................. | 251/315X |
| 3,398,926 | 8/1968 | Scaramucci.................. | 251/309X |
| 3,428,292 | 2/1969 | Scaramucci.................. | 251/315X |

Primary Examiner—Clarence R. Gordon
Attorney—Leonard L. Kalish

ABSTRACT: A ball valve including a tubular valve body having a cylindrical valve chamber therein and a valve ball revolvably and sealedly supported therein without contact with the walls thereof by two ball mounting rings of Teflon or the like, chamber closing end members at opposite ends of the body, each mounting ring having two narrow spaced apart concentric annular spherically faced ball sealing rings projecting very slightly from the ball facing side of the mounting ring, one such sealing ring being generally at the radially innermost portion of the ball facing side of the mounting ring and the other being generally at the radially outermost portion of the ball facing side of the mounting ring, and each mounting ring having two narrow spaced apart annular flat faced back up rings projecting very slightly from the closure facing side of the mounting ring and disposed in operative juxtaposition to the ball sealing rings and sealingly bearing against the corresponding closure member, and each mounting ring having a radially outermost cylindrical surface facing the chamberwall, said ball sealing rings and said backup rings being without flexibility or bendability in relation to the main body of the mounting ring

PATENTED DEC 15 1970

INVENTOR.
OSCAR H. GRAUER
BY
Leonard L. Kalish
ATTORNEY 3,547,403

BALL VALVES

THE FIELD OF THE INVENTION

The present invention relates to ball valves of the type in which a revolvable valve ball is operatively mounted within a cylindrical valve chamber of a tubular valve housing out of contact with the wall of the chamber by two mounting rings, and having two chamber closure end members, at least one of which is detachably secured to the valve housing, and in which the two chamber closure end members press the mounting rings against the valve-ball.

THE PRIOR ART

One category of prior art is exemplified by the valve constructions shown in U.S. Pat. Nos. 2,837,308, 2,890,856 and 2,945,666 in which the ball mounting rings have lips or flaps bearing against the ball under the influence of fluid pressure and in which such lips or flaps bearing against the ball under the influence of fluid pressure and in which such lips or flaps are flexible, bendable and deflectable in relation to a generally stationary portion of the ball mounting ring. Such flexible lipped ball engagement does not provide firm guidance for the ball about a fixed axis unless the valve ball is pivotally mounted to the valve housing by two coaxial pivots, as, for instance, in U.S. Pat. No. 2,837,308.

Another category of prior art is exemplified by the valve constructions shown in U.S. Pat. Nos. 2,606,738 and 2,895,496 in which each ball mounting ring has a single wide ball contacting surface and a single wide closure contacting surface.

SUMMARY OF THE INVENTION

According to my invention I provide narrow inner and outer concentric annular ball sealing rings on each mounting ring, which sealing rings are always in full contact with the valve ball, and narrow inner and outer concentric annular backup rings on each mounting ring, which backup rings are always in full contact with the closure member and which are in operative juxtaposition to the two sealing rings, the sealing rings and backup rings projecting from the main body of the mounting rings only to such small extent that in the operation of the valve they are not flexible, bendable or deflectable in relation to the main body of the mounting ring, whereby a high contact pressure per unit of contact area is obtained between the valve ball and mounting ring and between closure member and mounting ring, at radially inward and radially outward portions of the mounting ring, and whereby unvarying guidance is provided for the valve ball and reliable and durable fluid seal is provided between valve ball and the mounting rings and between the mounting rings and the closure members, and warping or twisting of the mounting rings about the centers of inertia of their radial cross sections is prevented.

DESCRIPTION OF THE PREFERRED EMBODIMENT OF THE INVENTION

Figure 1:
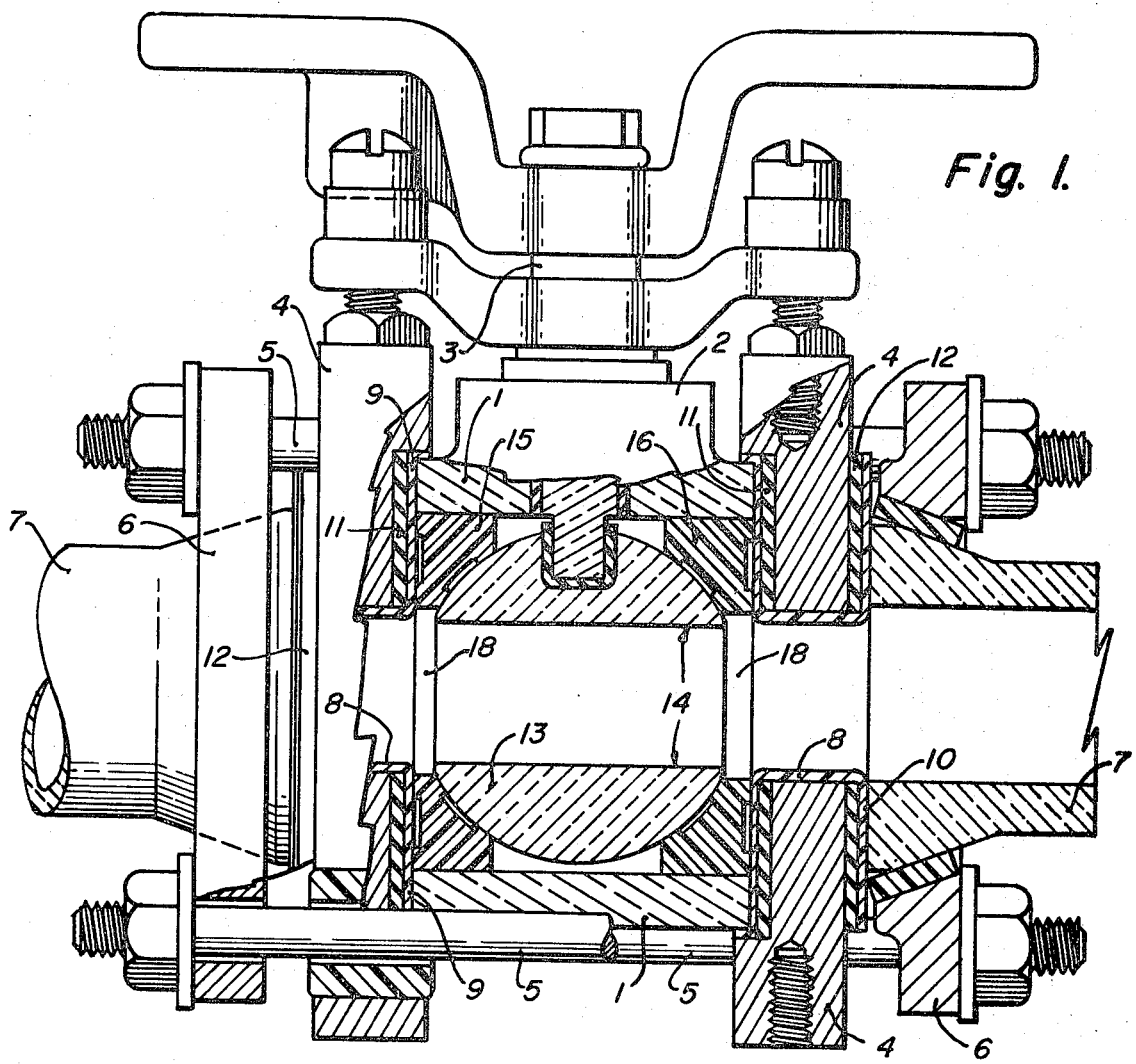
FIG. 1 represents a partially cross sectioned view of a valve embodying the present invention, in which the sealing rings and backup rings are not to scale but somewhat exaggerated in order to permit the better showing thereof within the valve illustrated in FIG. 1.
Figure 3:
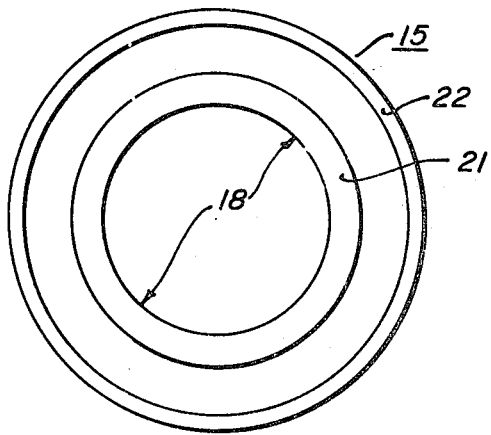
FIG. 3 represents an axial view of the closure facing side of the ball mounting ring.
Figure 2:
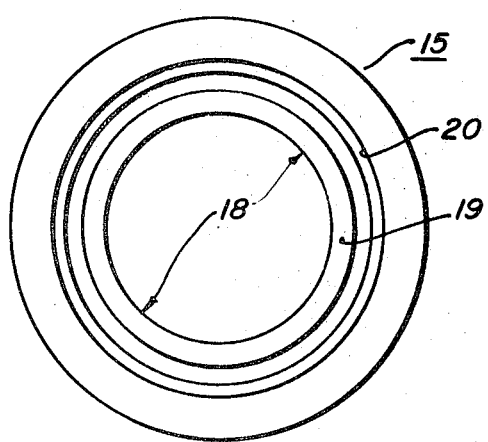
FIG. 2 represents an axial view of the ball facing side of the ball mounting ring.

The generally tubular valve body or housing 1 is preferably formed of or lined with glass or other essentially vitreous material or a ceramic material or a glass-ceramic composite, and has a cylindrical bore constituting a valve chamber and is provided with a stem mounting extension or bonnet 2 in which the valve stem 3 is revolvably mounted and suitably sealed against the passage of fluid under pressure in any conventional manner or in the manner shown in copending application Ser. No. 556,071 filed June 8, 1966. At each end of the tubular housing 1, a closure member 4 is provided, which is pressed against the ends of the housing 1 by means of bolts 5 which extend through holes in the closure members 4 and through the pipe coupling flanges 6 by which the glass pipes 7 are operatively mounted to the outer surfaces of the closure members 4.

A generally spool-shaped sealing member 8 of Teflon or the like, having inner and outer sealing discs 9 and 10, is operatively mounted to each closure member 4, in the manner indicated in FIG. 1, and resilient washers 11 of "Viton" or other suitable rubberlike or resilient plastic material are interposed between the sealing discs 9 and 10 of the spoollike sealing members 8 and the corresponding faces of the closure members 4.

The valve ball 13, having a fluid passageway 14, is mounted in the cylindrical valve chamber, out of contact with the wall thereof, by two ball mounting rings 15 and 16 of Teflon or other suitable plastic having resiliency, cold flow and other characteristics like Teflon.

Each ball mounting ring has an outer cylindrical surface 17 which may initially have a few thousandths of an inch clearance with the wall of the valve chamber and then contact such wall after the valve has been in operation for some time. The ball mounting ring has a central hole 18 constituting a fluid passageway there through. Two narrow concentric spherically faced annular ball sealing rings 19 and 20 project at a very slight distance from the ball facing side of the main body of each mounting ring and are in continuous and full contact with the spherical surface of the valve ball. The sealing ring 19 is at the radially innermost portion of the ball facing side of the mounting ring, generally adjacent to and in close proximity of the inner bore 18 of the mounting ring. The outer sealing ring 20 is at or near the radially outermost portion of the ball facing side of the mounting ring.

Two narrow concentric flat faced annular backup rings 21 and 22 project a very slight distance from the closure facing side of the main body of each mounting ring 15 and 16 and are in full and continuous contact with the corresponding closure member 4 (or the sealing disc 9 thereof) and are in operative juxtaposition to the ball sealing rings 19 and 20. The backup ring 21 is at or near the bore 18 of the mounting ring and in operative juxtaposition to the ball sealing ring 19. The backup ring 22 is generally at or near the radially outermost portion of the closure facing side of the mounting ring and is in operative juxtaposition to the ball sealing ring 20.

Figure 4:
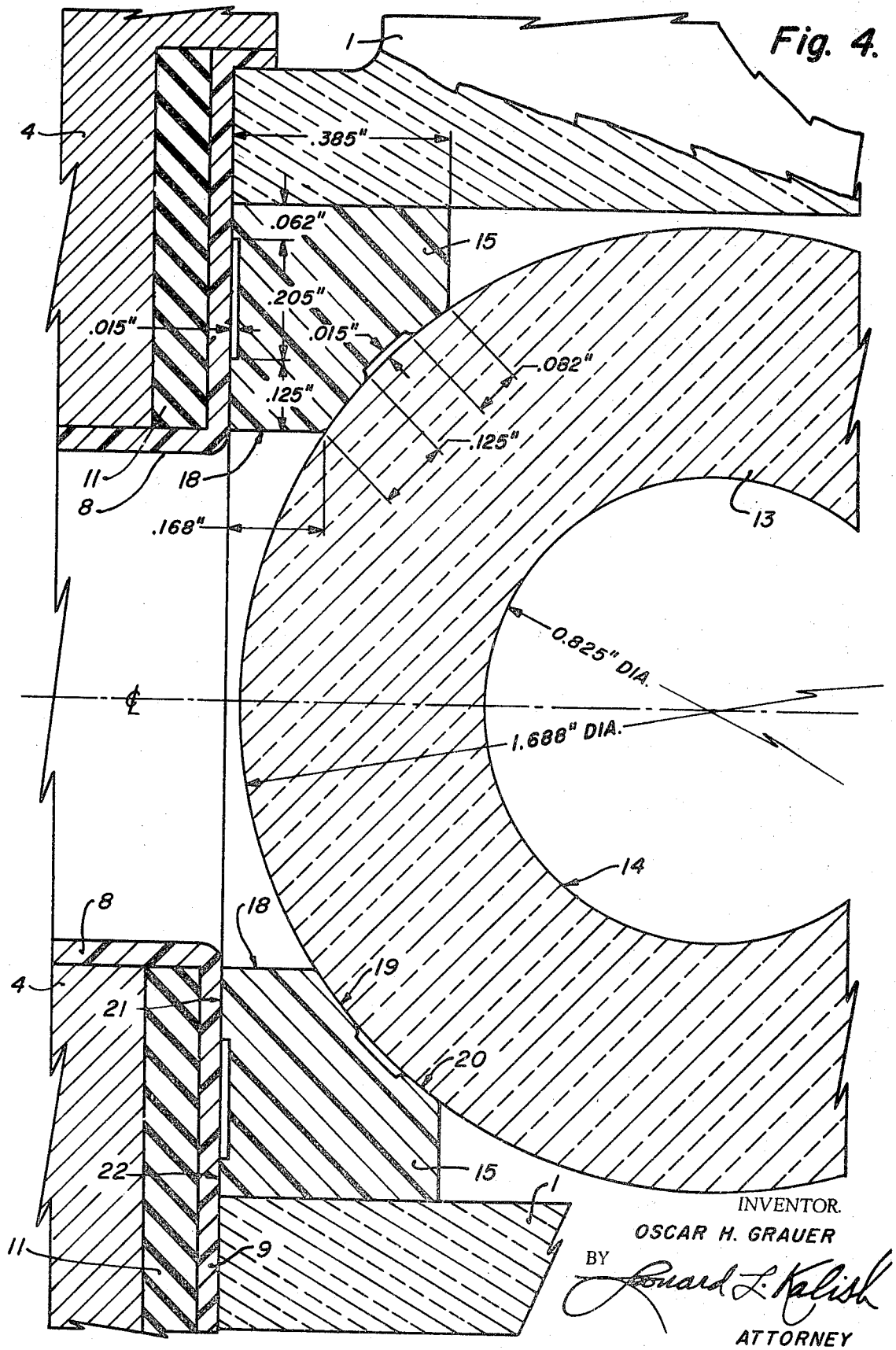
FIG. 4 represents an enlarged cross-sectional view of a fragmentary portion of the valve housing, the valve ball, the closure member and the ball mounting ring, shown on a scale five times the actual size of a nominal 1-inch valve.

By reason of the operative juxtaposition of the inner and outer ball sealing rings 19 and 20 and inner and outer backup rings 21 and 22, ball sealing rings 19 and 20 better support the valve ball 13 for rotation on a constant axis and form a better fluid seal with the valve ball, and the backup rings 21 and 22 form better fluid seals with the enclosure members 4, and such fluid seals are not significantly influenced by the pressure of the fluid passing through the valve while the valve is open. However, when the valve is closed, as indicated in FIG. 4, then on the downstream side of the valve the fluid seal between the ball sealing rings 19 and 20 and the valve ball and between the backup rings 21 and 22 and the closure member 4 is augmented by the pressure of the upstream fluid against the upstream surface of the closed valve ball, which urges the valve ball in a downstream direction with a force equal to the upstream fluid pressure per unit of area, multiplied by the area of the bore 18 of the upstream ball mounting ring.

The overall cross section of the ball mounting ring is such that the two closure members 4 are sealingly clamped against the corresponding ends of the valve body or housing 1, the two ball sealing rings 19 and 20 of each mounting ring will be in firm, full and continuous contact with the spherical surface of the valve ball and the two backup rings 21 and 22 will be in firm, full and continuous contact with the inner sealing disc 9 of the closure member 4. Such contact may very slightly compress the resilient washer or gasket 11 which intervenes the sealing disc 9 and the inner face of the closure member 4.

The full seating of the sealing rings 19 and 20 against the valve ball 13 and the full seating of the backup rings 21 and 22 against the closure member 4 (or the disc 9) is aided by the slight resiliency of the material of which the mounting ring is formed and by small size of the annular contact areas of the sealing rings 19 and 20 and of the backup rings 21 and 22, such small size thereof having the effect of magnifying the fluid sealing pressure which the closure members 4 exert on the sealing rings and on the backup rings.

By providing inner and outer backup rings and inner and outer ball sealing rings, not only is a double seal provided between the mounting ring and the closure member and between the mounting ring and the valve ball, but the twisting of the cross section of the mounting ring about the center of inertia of its cross section is prevented. This tends to avoid any unseating or variable seating of the mounting rings in relation to the valve ball and in relation to the closure members 4.

Because the sealing rings 19 and 20 project from the main body of the mounting ring only a very small distance, they are not significantly flexible, bendable or deflectable in relation to the main body of the mounting ring. Likewise, because of the very small distance the backup rings project from the closure facing side of the mounting ring, they are not significantly flexible, bendable or deflectable in relation to the main body of the mounting ring.

This lack of flexibility, bendability or deflectability between the sealing rings 19 and 20 and the main body of the mounting ring 15 and 16 and between the backup rings 21 and 22 and the main body of the mounting ring, and the continuous contact between the sealing rings 19 and 20 and the valve ball and between the backup rings 21 and 22 and the closure members 4 maintains such sealing rings and backup rings under compression without any flexing tendency and hence minimizes deleterious tensile stress in the mounting rings 15 and 16 which is associated with flexing.

The ball sealing rings 19 and 20 may be chamfered slightly at their respective inner and outer corners. Such chamfers may be of the order of 0.010", more or less. This further reduces the contact areas of the rings below that indicated by the dimensions in FIG. 4; the ring width dimensions shown on FIG. 4 indicating the widths of the rings prior to chamfering. The backup rings may be similarly chamfered.

The ball sealing rings 19 and 20 and the backup rings 21 and 22 are not only quite narrow in relation to the size of the mounting ring, but are preferably also of such width in relation to their respective diameters that their contact areas will be generally equal or more or less of the same order of magnitude, so that the contact pressure per unit of area between the ball sealing rings 19 and 20 and the spherical surface of the valve ball and between the backup rings 20 and 21 and the sealing disc 9 will be generally of the same order of magnitude. To this end, the outer ball sealing ring 20 is narrower than the inner ball sealing ring 19, and the outer backup ring 22 is narrower than the inner backup ring 21, and the outer backup ring 22 is narrower than the outer ball sealing ring 20.

In FIG. 4 I have shown dimensional and spacial relationships and relative proportions of the two sealing rings 19 and 20 and of the two backup rings 21 and 22 and of the mounting rings 15 and 16 as a whole. Such dimensional and spacial relationships and proportions indicated by the dimensions inscribed on FIG. 4 are intended to be only illustrative and not restrictive.

The various features or details of construction of my ball valve which are not fully shown in the accompanying drawings nor expressly described hereinabove may be in accordance with the corresponding features or details of construction shown and described in copending application Ser. No. 566,071 filed June 18, 1966, or may be any suitable conventional details of construction.

As used in the following claims, the word "glass" is intended to comprehend the so characterized member whether formed of or lined with glass or other essentially vitreous material or a ceramic material or a glass-ceramic composite.

I claim:

1. A ball valve including a valve housing having a cylindrical bore constituting a valve chamber, chamber closure end members at opposite ends of said valve housing, at least one of said closure members being separable from the housing and arranged to be detachably secured to the end thereof, each of said closure members having a fluid passageway therethrough, a valve ball having a fluid passageway therethrough, revolvably mounted within said chamber and out of contact with the wall thereof by two ball mounting rings of Teflon or the like operatively interposed between the closure members and the valve ball and maintained under axial compression between the valve ball and the closure members, each of said mounting rings having narrow inner and outer sealing rings projecting only slightly from the ball facing side of the mounting ring into continuous contact with the valve ball and having narrow inner and outer backup rings projecting only slightly from the closure facing side of the mounting ring into continuous contact with the closure and disposed in operative juxtaposition to said sealing rings, the width of said sealing rings and the distance of their projection from the main body of the mounting ring being such that in the operation of the valve the sealing rings are devoid of bendability in relation to the main body of the mounting ring.

2. A ball valve including a glass valve housing having a cylindrical bore constituting a valve chamber, chamber closure end members at opposite ends of said valve housing, at least one of said closure members being separable from the housing and arranged to be detachably and sealingly secured to the end thereof, each of said closure members having a fluid passageway therethrough, a glass valve ball having a fluid passageway therethrough, revolvably mounted within said chamber and out of contact with the wall thereof by two ball mounting rings of Teflon or the like operatively interposed between the closure members and the valve ball and maintained under axial compression between the valve ball and the closure members, each of said mounting rings having narrow inner and outer ball sealing rings projecting only slightly from the ball facing side of the mounting ring into continuous full contact with the valve ball and having narrow inner and outer backup rings projecting only slightly from the closure facing side of the mounting ring into continuous full contact with the closure and disposed in operative juxtaposition to said sealing rings, the width of said ball sealing rings and the distance of their projection from the main body of the mounting ring being such that in the operation of the valve the sealing rings are not deflectable in relation to the main body of the mounting ring.

3. A ball valve according to claim 1, including sealing means between the closure member and the corresponding end of the valve housing, and adjustable fastening means sealingly pressing the closure member against the end of the valve housing, with the sealing means therebetween, and exerting axial pressure between each closure member and the corresponding mounting ring and between each mounting ring and the valve ball.

4. A ball valve according to claim 2, including sealing means between the closure member and the end of the valve housing and means for sealingly pressing the closure member against the end of the valve housing, with the sealing means therebetween and for exerting axial pressure upon said ball mounting rings.

5. A ball valve according to claim 3, including a resilient washer between the closure member and its sealing means.

6. A ball valve according to claim 4, including a resilient washer between the closure member and its sealing means.